Aug. 30, 1927.
J. C. McCLAIN
1,640,790
ATTACHMENT FOR INTERNAL COMBUSTION ENGINES
Filed Nov. 1, 1923
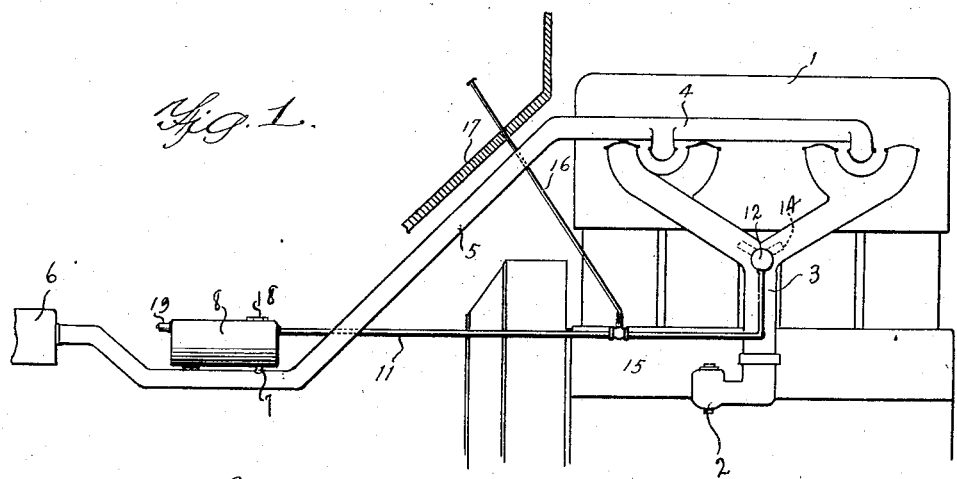
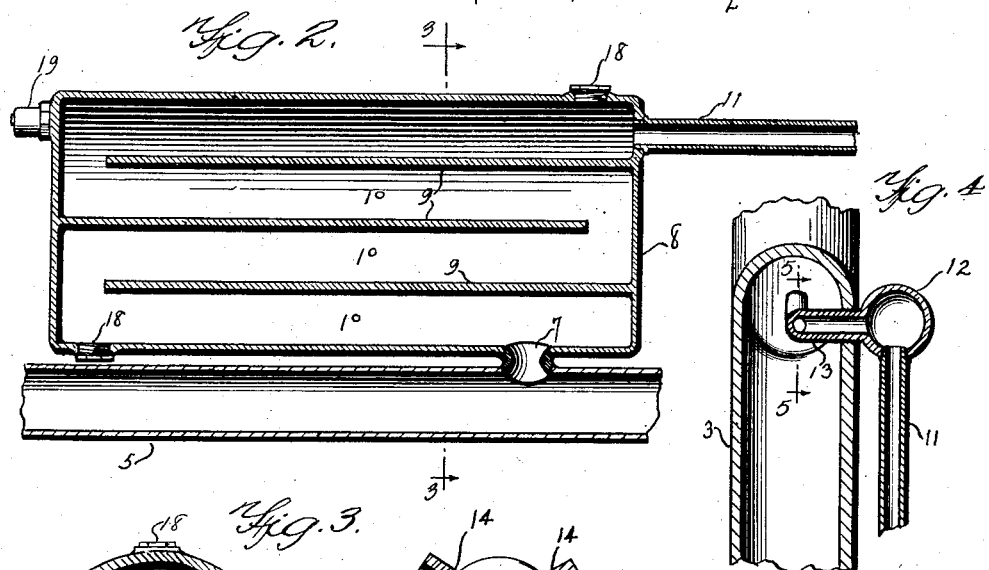
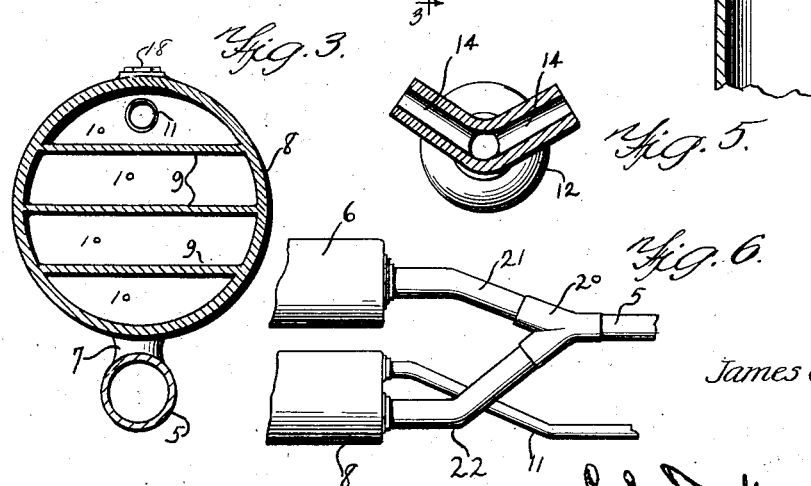
Inventor
James C. McClain
Attorney Patented Aug. 30, 1927.

1,640,790

UNITED STATES PATENT OFFICE.

JAMES C. McCLAIN, OF FALLS CITY, NEBRASKA.

ATTACHMENT FOR INTERNAL-COMBUSTION ENGINES.

Application filed November 1, 1923. Serial No. 672,235.

This invention relates to attachments for internal combustion engines, and more particularly to a gas generator.

An object of the invention is to provide means for returning a portion of the gases from the exhaust to the engine cylinders and thus eliminate the waste caused by passing partly consumed gases from the cylinders to the exhaust.

A further object is the provision of means for maintaining the returned gases under pressure.

A further object of the invention is the provision of a tank adapted to receive the exhaust gases, which tank is provided with a tortuous passage for the gases, whereby any carbon in the gases will be deposited in said chamber from which it may be removed.

In the accompanying drawings, I have shown several embodiments of the invention. In this showing:

Figure 1 is a side elevation of a portion of the power plant of a motor vehicle showing the invention applied, Figure 2 is a central longitudinal sectional view of the pressure tank and exhaust pipe, Figure 3 is a transverse sectional view on line 3—3 of Figure 2, Figure 4 is a detail sectional view of a portion of the intake manifold showing the inlet for the returned gases, Figure 5 is a detail sectional view on line 5—5 of Figure 4, and, Figure 6 is a side elevation of a portion of the tank and exhaust pipe showing a different form of connection between the pressure tank and exhaust pipe.

Referring to the drawings, the reference numeral 1 designates the engine of a motor vehicle, which engine is an internal combustion engine of any desired type. The propelling gases are delivered to the engine from a carburetor 2, through the intake manifold 3 in the usual manner, and the engine is provided with an exhaust manifold 4 connected to an exhaust pipe 5. A muffler 6 is arranged under the floor of the vehicle and connected to the exhaust pipe in the usual manner. The parts heretofore described are of the usual construction and form no part of the invention except in the combination claimed.

The exhaust pipe is provided with an opening adapted to receive a pipe 7, communicating with the bottom of a gas tight tank 8. This tank is provided with a plurality of baffles 9, forming a tortuous passage consisting of passages 10, extending from one end of the tank to the other. An outlet opening is arranged in the top of the tank and is adapted to receive a pipe 11, which communicates with a spray member 12, arranged in the manifold. As shown, the member 12 is provided with a pipe 13, projecting through the wall of the intake manifold and this pipe is provided with a pair of branches 14, extending into the two branches of the manifold. A valve 15 is arranged in the pipe 11 and a rod 16 is connected to this valve and extends through the floor board 17 of the vehicle to permit operation of the valve from the driver's seat.

The tank 8 is provided with a plurality of openings, closed by plugs 18, which may be removed at intervals to remove carbon from the baffle plates 9. It is further provided with a safety valve 19, which will permit escape of gases from the tank if the pressure becomes excessive.

In the form of the invention shown in Figure 6, of the drawings, the exhaust pipe is provided with a Y-joint 20, one branch of which is connected to the muffler by means of a pipe 21, and the other branch of which is connected to the tank 8 adjacent the bottom by means of a pipe 22.

The operation of the device is as follows:

The gases passing through the exhaust pipe 5 from the engine are maintained under pressure by the muffler 6 in the usual manner. It is essential that the connection to the tank 8 be arranged forwardly of the muffler or before the gases pass through the muffler where the pressure is released, in order that the gases entering the tank may be under pressure. The gases are preferably received in the bottom of the tank 8 which will maintain the pressure and the tortuous passage of the gases through the tank will permit any carbon to settle on the plates 9, from which it may be readily removed. The gases collecting in the tank 8 can only be discharged through the pipe 11 which is smaller in cross section than the exhaust pipe 5, thus affording more resistance and compressing the gases in the upper portion of the pressure tank. The gases pass through the pipe 11 to the spray device 12, whence they pass into the manifold and are mixed with the fresh charge of gas from the carburetor. The amount of gas fed to the manifold may be controlled by the valve 15. If the pressure in the tank 8 exceeds a predetermined point, the safety valve 19 will be opened.

In the form of the invention shown in Figure 6 of the drawings, the exhaust pipe communicates with the tank 8 through the branch pipe 22, which is substantially the same size as the exhaust pipe and which communicates with the tank 8 adjacent the bottom.

The device may be readily installed upon any type of vehicle employing an internal combustion engine as its propelling means and it gives more power and more mileage per unit of fuel consumed by returning the hot gases to the cylinders and thus aiding in the generation of additional gas from the raw gasoline.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

I claim:

The combination with an internal combustion engine, an exhaust pipe connected thereto, and a muffler connected to said pipe, of a pressure tank arranged at a remote point from said engine and adjacent but above said exhaust pipe between the engine and the muffler and in proximity to said muffler, an inlet pipe connected between the exhaust pipe and said tank whereby the latter receives gases under pressure, a pressure relief valve arranged in said pressure tank, baffles arranged within said tank to cause the gases to flow therethrough in a tortuous path, and an outlet pipe connected at one end to said tank, said outlet pipe having an end projecting into the intake manifold and having an outlet opening of smaller diameter than said inlet pipe whereby the gas will be maintained under relatively high pressure in said tank.

In testimony whereof, I affix my signature.

JAMES C. McCLAIN.